United States Patent
Hwang

(10) Patent No.: US 7,366,195 B2
(45) Date of Patent: Apr. 29, 2008

(54) APPARATUS AND METHOD FOR EFFICIENTLY TRANSMITTING AND RECEIVING MULTICAST DATA

(75) Inventor: Chan-soo Hwang, Yongin (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 1146 days.

(21) Appl. No.: 10/294,844

(22) Filed: Nov. 15, 2002

(65) Prior Publication Data

US 2003/0095561 A1    May 22, 2003

(30) Foreign Application Priority Data

Nov. 16, 2001 (KR) .............................. 2001-71402

(51) Int. Cl.
*H04J 3/26* (2006.01)
(52) U.S. Cl. ...................................... 370/432; 370/312
(58) Field of Classification Search ................ 370/312, 370/349, 432, 471, 474, 475
See application file for complete search history.

(56) References Cited

U.S. PATENT DOCUMENTS

| 5,477,533 | A |   | 12/1995 | Tsurumaki |
|---|---|---|---|---|
| 5,751,774 | A | * | 5/1998 | Wang .......................... 375/367 |
| 5,923,811 | A | * | 7/1999 | Kawamura et al. ............ 386/65 |
| 5,953,486 | A | * | 9/1999 | Hamamoto et al. ............ 386/68 |
| 2005/0060760 | A1 | * | 3/2005 | Jaffe et al. ................... 725/151 |

FOREIGN PATENT DOCUMENTS

| EP | 0 996 291 A1 | 4/2000 |
|---|---|---|
| EP | 1 154 660 A2 | 11/2001 |
| EP | 1 154 660 A3 | 11/2001 |
| JP | 7-212334 | 8/1995 |
| JP | 8-314821 | 11/1996 |
| JP | 2000-332751 | 11/2000 |

OTHER PUBLICATIONS

Aravind, et al., *, IEEE Transactions on Circuits and Systems for Video Technology, 6(5):426-435.

(Continued)

*Primary Examiner*—Chi Pham
*Assistant Examiner*—Phuc Tran
(74) *Attorney, Agent, or Firm*—Lee & Morse, P.C.

(57) ABSTRACT

Apparatuses and methods for efficiently transmitting and receiving multicast data having a scalable data structure preferably provide for the transmission of a first data stream at a basic data rate using a first modulation scheme that can be received by all receivers in a communications system, while simultaneously providing for the transmission of at least a second data stream at a higher data rate using a second modulation scheme that can be received by groups of receivers having higher data rate capabilities, thereby maximizing data communications to all receivers in the communications system. The transmitting apparatus preferably includes a stream generator that divides multicast data into a plurality of multicast streams, an encoding processor, a header processor that generates a header for each of the encoded multicast streams, a stream modulator that modulates each of the encoded multicast streams, and a frame generator for generating a transmission frame.

25 Claims, 16 Drawing Sheets

OTHER PUBLICATIONS

*Entitled: "Packet loss resilience of MPEG-2 scalable video coding algorithms" (Oct. 1996).

Chaddha, et al., **, Proceedings of IEEE Intnl Workshop on Network & Operating Systems Support for Digital Audio and Video, pp. 130-141, (Apr. 19, 1995).

**Entitled: "An end to end software only scalable video delivery system."

Guo, Quji, et al., ***, ISCAS 1001 Proceedings of the 2001 IEEE Intnl Symposium on Circuits and Systems, vol. 1 (of 5) pp. 141-144, (May 6, 2001).

***Entitled: "A sender-adaptive & receiver-driven layered muticast scheme for video over internet."

Rosenberg, et al, ****, IETF, Internet Engineering Task Force, 11 pages, (Nov. 3, 1998).

****Entitled: An RTP payload format for Reed Solomon codes.

* cited by examiner

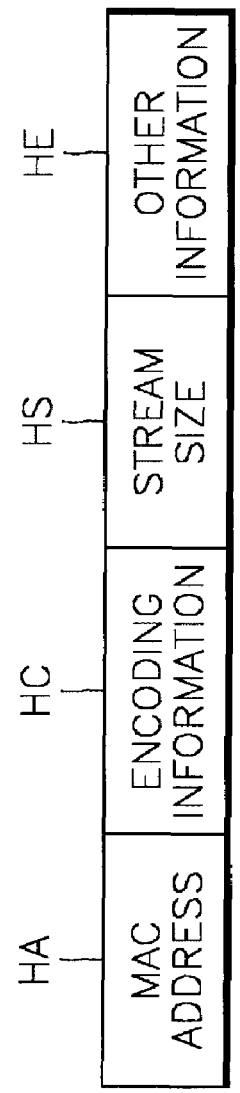
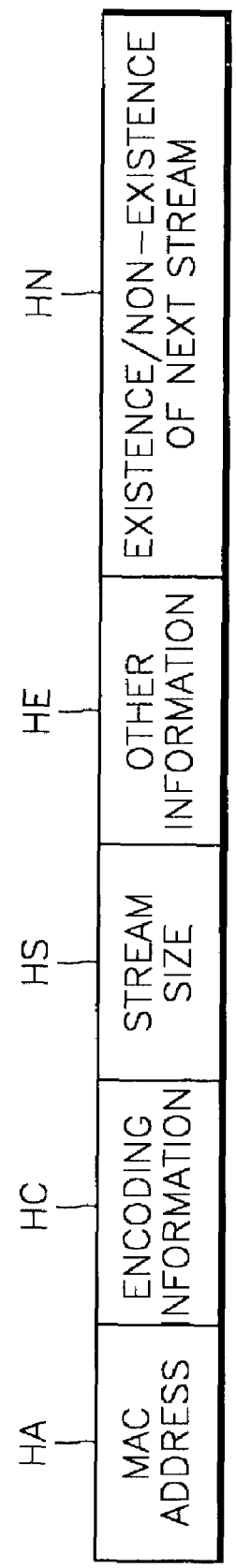

FIG. 6

| | DATA RATE (Mbps) 61 | MODULATION SCHEME 62 | CODE RATE 63 | NUMBER OF ENCODED BITS PER SUBCARRIER 64 | NUMBER OF ENCODED BITS PER OFDM SYMBOL 65 | NUMBER OF DATA BITS PER OFDM SYMBOL 66 |
|---|---|---|---|---|---|---|
| 71 | 6 | BPSK | 1/2 | 1 | 48 | 24 |
| | 9 | BPSK | 3/4 | 1 | 48 | 36 |
| 72 | 12 | QPSK | 1/2 | 2 | 96 | 48 |
| | 18 | QPSK | 3/4 | 2 | 96 | 72 |
| 73 | 24 | 16 QAM | 1/2 | 4 | 192 | 96 |
| | 36 | 16 QAM | 3/4 | 4 | 192 | 144 |
| | 48 | 64 QAM | 2/3 | 6 | 288 | 192 |
| | 54 | 64 QAM | 3/4 | 6 | 288 | 216 |

FIG. 8A

| λ | 0 | 0.2 | 0.4 | 0.6 | 0.8 | 1 |
|---|---|---|---|---|---|---|
| DATA RATE | 6Mbps | 5.7Mbps | 6.3Mbps | 6.6Mbps | 6Mbps | 6Mbps |
| NUMBER OF RECEIVING APPARATUSES AVAILABLE FOR BPSK | 20 | 19 | 17 | 15 | 12 | 10 |
| NUMBER OF RECEIVING APPARATUSES AVAILABLE FOR QPSK | 0 | 0 | 4 | 7 | 8 | 10 |
| OUTAGE | 0 | 1 | 3 | 5 | 8 | 10 |

FIG. 8B

| λ | 0 | 0.2 | 0.4 | 0.6 | 0.8 | 1 |
|---|---|---|---|---|---|---|
| DATA RATE | 6Mbps | 6Mbps | 7.2Mbps | 7.5Mbps | 7.5Mbps | 7.8Mpbs |
| NUMBER OF RECEIVING APPARATUSES AVAILABLE FOR BPSK | 20 | 19 | 18 | 16 | 14 | 13 |
| NUMBER OF RECEIVING APPARATUSES AVAILABLE FOR QPSK | 0 | 1 | 6 | 9 | 11 | 13 |
| OUTAGE | 0 | 1 | 2 | 4 | 6 | 7 |

FIG. 8C

| λ | 0 | 0.2 | 0.4 | 0.6 | 0.8 | 1 |
|---|---|-----|-----|-----|-----|---|
| DATA RATE | 6Mbps | 6.6Mbps | 8.4Mbps | 8.1Mbps | 7.8Mbps | 7.8Mbps |
| NUMBER OF RECEIVING APPARATUSES AVAILABLE FOR BPSK | 20 | 19 | 18 | 16 | 14 | 13 |
| NUMBER OF RECEIVING APPARATUSES AVAILABLE FOR QPSK | 0 | 3 | 10 | 11 | 12 | 13 |
| OUTAGE | 0 | 1 | 2 | 4 | 6 | 7 |

APPARATUS AND METHOD FOR EFFICIENTLY TRANSMITTING AND RECEIVING MULTICAST DATA

BACKGROUND OF THE INVENTION

1. Field of the Invention

The present invention relates to an apparatus for wirelessly transmitting and receiving multicast data. More particularly, the present invention relates to an apparatus for efficiently and wirelessly transmitting and receiving multicast data having a scalable data structure, methods thereof, and a wireless communication system including the transmitting apparatus and the receiving apparatus.

2. Description of the Related Art

Multicast means sending the same information to a plurality of receivers (hereinafter, referred to as receiving apparatuses) with a single transmission. Multicast technology is advantageous in efficiently using network resources without wastage and is thus used for ultra high-speed data.

In transmitting data (hereinafter, referred to as multicast data) through multicast, the amounts of data that each one of the receiving apparatuses can receive through a network per unit time, that is, the data rates of the receiving apparatuses, may be different. Here, when a transmitting apparatus transmits data at a fixed data rate, the transmitting apparatus must transmit data at the lowest data rate among the data rates of the receiving apparatuses so that all of the receiving apparatuses are able to receive the data. If the transmission data rate is increased, receiving apparatuses having a lower data rate than the transmission data rate cannot receive data transmitted from the transmitting apparatus.

In order to overcome this problem, there has been proposed a method of dividing multicast data into several streams, transmitting only some of the streams to receiving apparatuses having a lower data rate than a transmission data rate, and transmitting all of the streams to receiving apparatuses having a higher data rate than the transmission data rate. In order to effectively perform this method, a part of the data (i.e., basic data, like video or audio data) needs to include basic information, which can provide original data of low quality, and the remaining part of the data (i.e., additional data) may include more detailed information to be added to the basic data so that original data of high quality can be provided. Such a data structure is defined as being scalable. Motion Pictures Experts Group 4 (MPEG4) is a representative coding method using such scalability.

Unbalanced modulation is a scheme for transmitting multicast data having a scalable data structure in a wireless transmitting system. Representative unbalanced modulation schemes include Unbalanced Quadrature Phase Shift Keying (UQPSK) and Unbalanced Quadrature Amplitude Modulation (UQAM). These schemes are the same when a single signal element has two bits, and thus only UQPSK will be described below with reference to the attached drawings.

FIG. 1A illustrates a block diagram of a communication system using UQPSK. Referring to FIG. 1A, a communication system using UQPSK includes a transmitting apparatus 100 and a receiving apparatus 110. For clarity of the description, a communication channel 120 is illustrated in FIG. 1A.

The transmitting apparatus 100 modulates a basic data signal 1 and an additional data signal 2 using a sine wave 3, $D_1 \times \sin(\omega_c t)$, and a cosine wave 4, $D_2 \times \cos(\omega c t)$, having the same frequency to generate a basic modulated signal 5 and an additional modulated signal 6 and adds the basic modulated signal 5 and the additional modulated signal 6 to generate a transmission signal 7.

The transmission signal 7 is transmitted to the receiving apparatus 110 through the communication channel 120. During the transmission, noise is added to the transmission signal 7, which results in a noisy transmission signal 17.

The receiving apparatus 110 demodulates the noisy transmission signal 17 using a sine wave 13, $\sin(\omega_c t)$, which is synchronized with the sine wave 3 of the transmitting apparatus 100, and a cosine wave 14, $\cos(\omega_c t)$, which is synchronized with the cosine wave 4 of the transmitting apparatus 100, to generate a basic data signal 11 with noise and an additional data signal 12 with noise.

FIG. 1B illustrates a constellation I/Q plot with respect to a transmission signal in the UQPSK modulation scheme. Referring to FIG. 1B, the basic modulated signal 5 and the additional modulated signal 6 are the in-phase (I) component and the quadrature (Q) component, respectively, of the transmission signal 7. Here, the magnitude of the I component is the same as the amplitude $D_1$ of the sine wave 3, and the magnitude of the Q component is the same as the amplitude $D_2$ of the cosine wave 4. When $D_2 = \lambda \times D_1$, $\lambda$ has a value between 0 and 1 in the UQPSK modulation scheme. When $\lambda$ is 0, binary PSK (BPSK) is performed. When $\lambda$ is 1, unbalanced QPSK is performed.

Referring to FIG. 1B, when $D_1$ and $D_2$ are fixed in the transmitting apparatus 100, the receiving apparatus 110 can selectively receive a Q component according to the magnitude of noise added to a received signal. In other words, when a signal-to-noise ratio (SNR) is high and the magnitude of noise is less than the amplitude $D_2$ of a Q component, the receiving apparatus 110 receives both I and Q components and combines them to obtain original data in which additional information is added to basic information. However, when an SNR is low and the magnitude of noise is greater than the amplitude $D_2$ of a Q component, the receiving apparatus 110 receives only an I component and obtains only basic data.

Referring to FIG. 1B, upon transmission, data in the transmission signal 7 is identifiable as one of four representative signal points 21, 22, 23, and 24 in the I/Q constellation. However, after propagation through the communications channel 120, the receiving apparatus 110 receives a noisy transmission signal 17 which can change the locus for the signal points in the I/Q constellation. For example, if the receiving apparatus 110 receives a signal that corresponds to the signal point 25, it is necessary to determine whether the original transmission signal 7 corresponds to the signal point 21 or 22 in order to receive the Q component. For a case where the original transmission signal 7 actually corresponds to the signal point 22 having a magnitude of noise added to the Q component of $n_2$, if the receiving apparatus 110 determines that the transmission signal 7 corresponds to the signal point 21 and that the magnitude of noise added to the Q component is $n_1$, an error occurs. Accordingly, as the amplitude $D_2$ of the Q component increases, the probability of an error occurring due to noise decreases, and thus more receiving apparatuses can receive additional data.

However, since transmission power must be constant in the UQPSK modulation scheme, the I component must be decreased when the Q component is increased. Referring to FIG. 1B, signal points must be located on a unit circle 26 to maintain a constant transmitting power. In such a plot, when $D_2$ is increased, $D_1$ is decreased. Accordingly, when the magnitude of the Q component is increased for a group of first receiving apparatuses having a high SNR, a group of second receiving apparatuses having a low SNR may not receive the I component because the magnitude of noise is greater than the amplitude $D_1$. Such a state in which a receiving apparatus having a low SNR cannot receive basic data transmitted from a transmitting apparatus is referred to as an outage.

In other words, in a method of transmitting multicast data having a scalable data structure using an unbalanced modulation scheme, basic data and additional data are transmitted using a single method, and a receiving apparatus determines whether to receive the additional data according to a physical state thereof. Accordingly, when all receiving apparatuses increase a data rate to increase the amount of received data, an outage occurs and thus a data rate cannot be increased any further.

SUMMARY OF THE INVENTION

In an effort to solve the above-described problems, it is a first feature of an embodiment of the present invention to provide apparatuses and methods for efficiently and wirelessly transmitting and receiving multicast data having a scalable data structure, in which a data rate for each stream to be transmitted and a receiving apparatus group are previously set in order to increase the amount of additional information received by all receiving apparatuses without having any receiving apparatuses that do not receive the basic information, thereby maximizing the amount of data received by all of the receiving apparatuses and maximizing the number of receiving apparatuses that are able to receive high-quality information including basic information and additional information.

It is a second feature of an embodiment of the present invention to provide a system including the above transmitting apparatus and multiple receiving apparatuses, for wirelessly communicating multicast data.

To provide the first feature of the present invention, there is provided a transmitting apparatus for wirelessly transmitting multicast data having a scalable data structure to a plurality of external receiving apparatuses. The transmitting apparatus preferably includes a stream generator that divides the multicast data having a scalable data structure into a plurality of multicast streams corresponding to predetermined data rates at which the plurality of external receiving apparatuses can receive data; an encoding processor that individually encodes the plurality of multicast streams; a header processor that generates a header corresponding to each of the encoded multicast streams and modulates the header at a predetermined data rate; a stream modulator that modulates each of the encoded multicast streams at predetermined data rates corresponding to the respective encoded multicast streams; and a frame generator that adds the modulated headers to the modulated multicast streams to generate at least one transmission frame.

The encoding processor of the transmitting apparatus preferably includes: a first processor that performs forward error correction (FEC) encoding on the plurality of multicast streams; a second processor that performs interleaving of the FEC-encoded multicast streams; and a third processor that performs signal constellation mapping on the FEC-encoded and interleaved multicast streams. The stream generator of the transmitting apparatus preferably generates the plurality of multicast streams such that a multicast stream including basic information corresponds to the lowest data rate at which all of the receiving apparatuses can receive data and that multicast streams including additional information, which is added to the basic information to generate high-quality information, correspond to data rates that allow the sum of the amounts of multicast data received by all of the receiving apparatuses to be maximized. Alternatively, the stream generator of the transmitting apparatus may generate the plurality of multicast streams such that a multicast stream including basic information corresponds to the lowest data rate at which all of the receiving apparatuses can receive data and that each multicast stream including additional information corresponds to a data rate that allows the product of the predetermined data rate and the number of receiving apparatuses available at the predetermined data rate to be maximized.

The header processor of the transmitting apparatus preferably modulates headers at the same data rates as those of multicast streams corresponding to the headers. The header processor may modulate the headers at the lowest data rate at which all of the receiving apparatuses can receive data. Each header preferably includes a media access control (MAC) address of a receiving apparatus group that includes receiving apparatuses having a data rate at which a multicast stream corresponding to the header can be received, encoding information that has been applied to the multicast stream, and the size of the multicast stream. Each header may further include information indicating the existence or non-existence of another multicast stream corresponding to a higher data rate than a data rate corresponding to the current multicast stream.

The frame generator of the transmitting apparatus preferably adds the modulated headers to the corresponding modulated multicast streams, to generate a plurality of transmission frames. The frame generator also preferably arranges the modulated multicast streams in ascending order of data rate and adds a set of the modulated headers that are arranged according to the order of the modulated multicast streams to the front of a set of the arranged modulated multicast streams to generate a single transmission frame.

There is also provided a method of wirelessly transmitting multicast data having a scalable data structure to a plurality of external receiving apparatuses, which preferably includes dividing the multicast data having a scalable data structure into a plurality of multicast streams corresponding to predetermined data rates at which the plurality of external receiving apparatuses can receive data; individually encoding the plurality of multicast streams; generating a header corresponding to each of the encoded multicast streams and modulating the header at a predetermined data rate; modulating each of the encoded multicast streams at a predetermined data rate; and adding the modulated headers to the modulated multicast streams to generate at least one transmission frame. Individually encoding the plurality of multicast streams preferably further includes performing forward error correction (FEC) encoding on the plurality of multicast streams; performing interleaving of the FEC-encoded multicast streams; and performing signal constellation mapping on the FEC-encoded and interleaved multicast streams.

Dividing the multicast data into a plurality of multicast streams preferably includes generating the plurality of multicast streams such that a multicast stream including basic information corresponds to the lowest data rate at which all of the receiving apparatuses can receive data and that multicast streams including additional information, which is added to the basic information to generate high-quality information, correspond to data rates that allow the sum of the amounts of multicast data received by all of the receiving apparatuses to be maximized. Alternatively, dividing the multicast data into a plurality of multicast streams may include generating the plurality of multicast streams such that a multicast stream including basic information corresponds to the lowest data rate at which all of the receiving apparatuses can receive data and that each multicast stream including additional information corresponds to a data rate that allows the product of the predetermined data rate and the number of receiving apparatuses available at the predetermined data rate to be maximized.

Generating the header preferably includes modulating the headers at the same data rates as those of multicast streams corresponding to the headers. Generating the header may include modulating the headers at the lowest data rate at which all of the receiving apparatuses can receive data. Each header preferably includes: a media access control (MAC) address of a receiving apparatus group that includes receiving apparatuses having a data rate at which a multicast stream corresponding to the header can be received, encoding information that has been applied to the multicast stream, and the size of the multicast stream. Each header may further including information indicating the existence or non-existence of another multicast stream corresponding to a higher data rate than a data rate corresponding to the current multicast stream.

Adding the modulated headers to the modulated multicast streams may include adding the modulated headers to the corresponding modulated multicast streams, to generate a plurality of transmission frames. Adding the modulated headers to the modulated multicast streams may also include arranging the modulated multicast streams in ascending order of data rate and adding a set of the modulated headers that are arranged according to the order of the modulated multicast streams to the front of a set of the arranged modulated multicast streams to generate a single transmission frame In order to implement the foregoing method of wirelessly transmitting multicast data, there is preferably provided in association with the transmitting apparatus a computer readable recording medium in which a program is recorded, the program being provided for performing in a computer the steps of: dividing multicast data having a scalable data structure into a plurality of multicast streams corresponding to predetermined data rates at which a plurality of external receiving apparatuses can receive data; individually encoding the plurality of multicast streams; generating a header corresponding to each of the encoded multicast streams and modulating the header at a predetermined data rate; modulating each of the encoded multicast streams at a predetermined data rate; and adding the modulated headers to the modulated multicast streams to generate at least one transmission frame.

There is also provided a receiving apparatus for wirelessly receiving multicast data having a scalable data structure from an external transmitting apparatus. The receiving apparatus preferably includes a header demodulator that demodulates a header portion of at least one transmission frame transmitted from the external transmitting apparatus to generate a header information signal; a stream demodulator that demodulates a data stream portion to be received from the transmission frame in response to the header information signal to generate one or more encoded data streams; a decoder that decodes the one or more encoded data streams; and a data mixer that mixes the one or more decoded data streams and outputs data having a scalable data structure.

There is further provided a method for wirelessly receiving multicast data having a scalable data structure from an external transmitting apparatus, which includes demodulating a header portion of at least one transmission frame transmitted from the external transmitting apparatus and determining a data stream portion to be received from the transmission frame; demodulating the data stream portion to generate one or more encoded data streams; decoding the one or more encoded data streams; and mixing the one or more decoded data streams and outputting data having a scalable data structure. In order to implement the foregoing method of wirelessly receiving multicast data, there is preferably provided in association with the receiving apparatus a computer readable recording medium in which a program is recorded, the program being provided for performing in a computer the steps of: demodulating a header portion of at least one transmission frame transmitted from an external transmitting apparatus and determining a data stream portion to be received from the transmission frame; demodulating the data stream portion to generate one or more encoded data streams; decoding the one or more encoded data streams; and mixing the one or more decoded data streams and outputting data having a scalable data structure.

To provide the second feature of the present invention, there is provided a wireless communication system including a transmitting apparatus and a plurality of receiving apparatuses. The transmitting apparatus preferably includes a stream generator that divides multicast data having a scalable data structure into a plurality of multicast streams corresponding to predetermined data rates at which the plurality of receiving apparatuses can receive data; an encoding processor that individually encodes the plurality of multicast streams; a header processor that generates a header corresponding to each of the encoded multicast streams and modulates the header at a predetermined data rate; a stream modulator that modulates each of the encoded multicast streams at a predetermined data rate; and a frame generator that adds the modulated headers to the modulated multicast streams to generate at least one transmission frame. Each one of the plurality of receiving apparatuses preferably includes a header demodulator that demodulates a header portion of at least one transmission frame transmitted from the transmitting apparatus to generate a header information signal; a stream demodulator that demodulates a data stream portion to be received from the transmission frame in response to the header information signal to generate one or more encoded data streams; a decoder that decodes the one or more encoded data streams; and a data mixer that mixes the one or more decoded data streams and outputs data having a scalable data structure.

BRIEF DESCRIPTION OF THE DRAWINGS

The above and other features and advantages of the present invention will become readily apparent to those of ordinary skill in the art by describing in detail preferred embodiments thereof with reference to the attached drawings in which:

FIGS. 3A and 3B illustrate the structures of headers in a transmitting apparatus for transmitting multicast data according to an embodiment of the present invention;

FIG. 6 illustrates a table of parameters related to each modulation scheme that is supported by the Institute of Electrical and Electronics Engineers (IEEE) 802.11a standard;

FIGS. 8A through 8C illustrate tables showing data rates and the numbers of outages with respect to receiving apparatuses in each range shown in FIG. 7 in a communication system using the UQPSK modulation scheme as shown in FIG. 1A.

DETAILED DESCRIPTION OF THE INVENTION

Figure 1A:
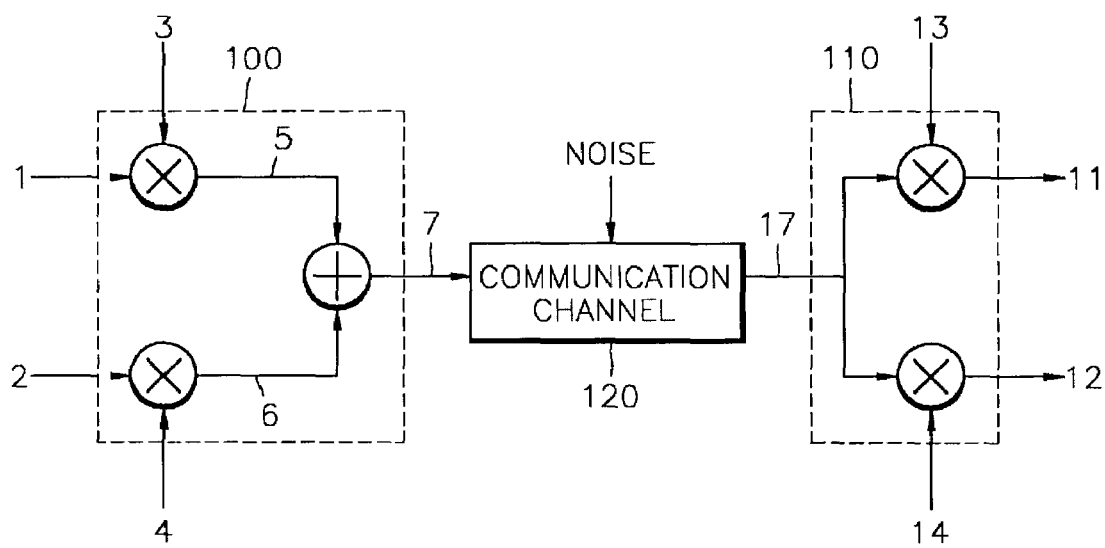
FIG. 1A illustrates a block diagram of a communication system using Unbalanced Quadrature Phase Shift Keying (UQPSK)

Korean Patent Application No. 2001-71402, filed Nov. 16, 2001, and entitled: "Apparatus and Method for Efficiently Transmitting and Receiving Multicast Data," is incorporated by reference herein in its entirety.

Apparatuses and methods for transmitting and receiving multicast data according to the embodiments of the present invention will now be described in detail with reference to the attached drawings. In the drawings, like reference numerals refer to like elements throughout.

In the present invention, a transmitting apparatus should be informed of the total number of receiving apparatuses, the receiving performance of each receiving apparatus, and the state of a transmission channel to each receiving apparatus. General communication systems satisfy this condition, since the above information may be derived from the signal content of a previous communication received/transmitted at each receiver/transmitter.

In order to maximize the amount of data that is received by all receiving apparatuses without having any receiving apparatuses not receive the basic information, a method of transmitting basic data should be independent of a method of transmitting additional data. In an unbalanced modulation scheme, when two types of data are transmitted using a same method, they influence each other. Accordingly, if the power of a quadrature (Q) component of a signal that includes additional data is increased for receiving apparatuses that have a high signal-to-noise ratio (SNR) and thus can receive data at a high data rate, the power of the in-phase (I) component of both the additional data and the basic data decreases, which may cause an outage to occur in receiving apparatuses having a low SNR.

In order to overcome this problem, a transmitting apparatus for transmitting multicast data according to the present invention preferably sets data rates at which individual receiving apparatuses can receive data based on the number of all receiving apparatuses, the performance of each receiving apparatus, and a state or quality of a transmission channel to each receiving apparatus. The transmitting apparatus preferably also classifies the receiving apparatuses into groups corresponding to different data rates based on the set data rates and determines to what extent basic information and additional information are to be transmitted to each group. Accordingly, the transmitting apparatus divides multicast data into a plurality of multicast streams and matches each multicast stream with a receiving apparatus group and with a modulation scheme by which data can be transmitted at an optimal data rate, which corresponds to the particular receiving apparatus group. Each one of the multicast streams is matched to a particular receiving apparatus group, such that the amount of data received by all of the receiving apparatuses is maximized. Here, a multicast stream that includes basic information is preferably matched to a receiving apparatus group that includes all of the receiving apparatuses, thereby allowing all of the receiving apparatuses to receive the basic information. A multicast stream that includes additional information may be matched with a receiving apparatus group that includes those receiving apparatuses that are able to receive data at a high data rate. This maximizes the amount of data that can be received by all of the receiving apparatuses while also maximizing the number of receiving apparatuses that can receive both basic information and additional information, thus obtaining higher-quality information than receiving apparatuses receiving only the basic information.

Figure 2:
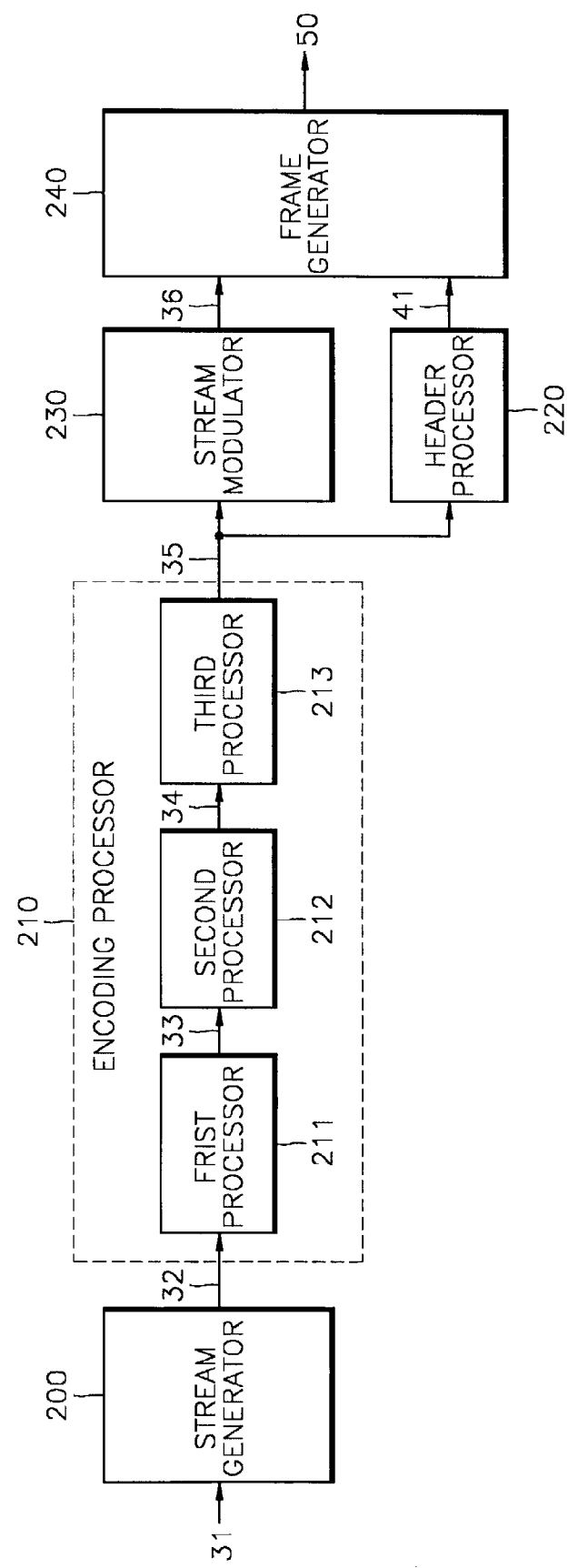
FIG. 2 illustrates a block diagram of a transmitting apparatus for transmitting multicast data according to an embodiment of the present invention.

FIG. 2 illustrates a block diagram of a transmitting apparatus for transmitting multicast data according to an embodiment of the present invention. Referring to FIG. 2, the transmitting apparatus preferably includes a stream generator 200, an encoding processor 210, a header processor 220, a stream modulator 230, and a frame generator 240.

The stream generator 200 preferably divides multicast data 31, which has a scalable data structure according to data rates at which a plurality of external receiving apparatuses can receive data, into a plurality of multicast streams 32. Each one of the plurality of multicast streams 32 correspond to a predetermined data rate, such that collectively the amount of multicast data received by all of the receiving apparatuses is maximized while all of the receiving apparatuses are still able to receive basic information.

The conditions of optimal transmission will be described in terms of the following formulas. A unit signal element in data transmission is referred to as a burst (n). In modulation, a data rate (r) indicates the number of data bits included in each burst. Accordingly, when a multicast stream having a size of r×n is modulated at a data rate "r", "n" bursts are generated.

For example, N multicast streams generated by the stream generator 200 are numbered from 1 to N in ascending order of data rate corresponding to each multicast stream. The data rates corresponding to the multicast streams are denoted by $r_1, r_2, \ldots, r_N$. The numbers of receiving apparatuses included in individual receiving apparatus groups corresponding to the individual multicast streams are denoted by $u_1, u_2, \ldots, u_N$. The numbers of bursts generated after the individual multicast streams are modulated are denoted by $n_1, n_2, \ldots, n_N$. Here, a condition of maximizing the amount of multicast data received by all of the receiving apparatuses is satisfied by maximizing the formula $$\sum_{k=1}^{N} u_k (r_k n_k) = \sum_{k=1}^{N} (r_k u_k) n_k \qquad (1)$$

In order to allow all of the receiving apparatuses to receive basic information, a multicast stream corresponding to the lowest data rate, i.e., the data rate at which all of the receiving apparatuses can receive data, needs to be sufficiently large to include all of the basic information. This may be expressed as.

$$n_1 r_1 \geq r_{min} \qquad (2)$$

where $r_{min}$ indicates the size of basic data in bit units.

The data rates $r_1$ through $r_N$ and the numbers $u_1$ through $u_N$ of receiving apparatuses included in each receiving apparatus group are preferably determined based on data rates at which the receiving apparatuses can receive data and modulation schemes that can be performed by the transmitting apparatus. Accordingly, only the numbers of bursts $n_1$ through $n_N$ can be determined by the stream generator 200. However, since the number of bursts that can be transmitted by the transmitting apparatus is restricted, determining the numbers of bursts is concerned with constrained optimization.

When a total number of bursts is M, in order to satisfy Formula (2), the smallest integer L which is greater than $r_{min}/r_1$ must be allocated to $n_1$, and M−L must be allocated to $n_k$ that has the largest coefficient $r_k u_k$ among the numbers $n_k$ (k=1, . . . , N) of bursts. In other words, the multicast streams 32 are generated such that basic data is included in a multicast stream corresponding to the lowest data rate and the remaining additional data is included in a multicast stream corresponding to a data rate at which the product of the data rate and the number of receiving apparatuses that can receive data at that data rate is maximized.

The encoding processor 210 individually encodes each of the multicast streams 32. To achieve this, preferably, the encoding processor 210 includes a first processor 211 that performs forward error correction (FEC) encoding on each of the multicast streams 32, a second processor 212 that interleaves each FEC encoded multicast stream 33, and a third processor 213 that performs signal constellation mapping on each FEC encoded and interleaved multicast stream 34. An encoding process performed by the encoding processor 210 indicates channel encoding. Channel encoding has a function of correcting errors. FEC encoding, which is used in wireless communication systems, uses a cyclic redundancy check (CRC) code, a convolutional code, or a turbo code. When FEC encoding is not sufficient for error correction, as in the case of a burst error, interleaving is used. Interleaving is a method of independently dispersing bits in a signal to convert a burst error into a random error so that error correction may be performed.

Signal constellation mapping means adjusting the phase and amplitude of each signal point in a modulation scheme such as QPSK or quadrature amplitude modulation (QAM). For example, signal constellation mapping in the signal constellation shown in FIG. 1B is performed to adjust the value of λ in order to change the magnitudes of $D_1$ and $D_2$.

Referring to FIG. 2, the first through third processors 211 through 213 perform FEC encoding, interleaving, and signal constellation mapping, respectively. However, this is just an example, and the disposition of these processors 211 through 213 or an encoding method may change depending on the channel state and the state of each receiving apparatus.

The header processor 220 generates headers corresponding to the individual encoded multicast streams 35 and modulates them at predetermined data rates. A header is generated for each of the multicast streams and includes information that is necessary for receiving apparatuses to receive the multicast streams.

FIGS. 3A and 3B illustrate the structures of headers in a transmitting apparatus for transmitting multicast data according to an embodiment of the present invention. Referring to FIG. 3A, a header in the transmitting apparatus according to an embodiment of the present invention includes a media access control (MAC) address HA of a receiving apparatus group to which a multicast stream corresponds, encoding information HC that is applied to the multicast stream, the size HS of the multicast stream, and other information HE.

Methods of providing multicast in a local area network (LAN) preferably include a method of using a plurality of MAC addresses for unicast and a method of using a plurality of MAC addresses for multicast. In the method of using a plurality of MAC addresses for unicast, the same information is transmitted to each of a plurality of receiving apparatuses and the channel-use efficiency is the same as in unicast. MAC addresses for multicast need to be used in order to utilize the advantage of multicast for efficiently using a transmission channel. In a case of HiperLAN 2, thirty-two addresses among 256 MAC addresses are assigned for multicast. In order to use multicast MAC addresses, it is necessary to define groups of receiving apparatuses to receive multicast and allocate a MAC address to each group. The encoding information HC applied to each multicast stream includes an FEC encoding method, a coding rate, a puncturing method, an interleaving method, a signal constellation method, a modulation data rate, etc.

Referring to FIG. 3B, the header may also include a bit HN indicating the existence or non-existence of a multicast stream corresponding to a higher data rate. When the HN bit is 1, a multicast stream corresponding to a higher data rate exists. When the HN bit is 0, the relevant multicast stream corresponds to the highest data rate. A header such as the one described above is modulated by a modulation scheme having a predetermined data rate. In order to decrease errors in header transmission, it is preferable to modulate the header at the lowest data rate at which all of the receiving apparatuses can receive data. However, since it is not necessary for a header corresponding to a multicast stream that is not to be received by a receiving apparatus to be received by that receiving apparatus, each header may be modulated at the same data rate as the corresponding multicast stream.

Referring back to FIG. 2, the stream modulator 230 modulates each encoded multicast stream 35 at a corresponding data rate, thereby generating modulated multicast streams 36. The frame generator 240 adds modulated headers 41 to the respective multicast streams 36 in order to generate at least one transmission frame 50.

Figure 4A:
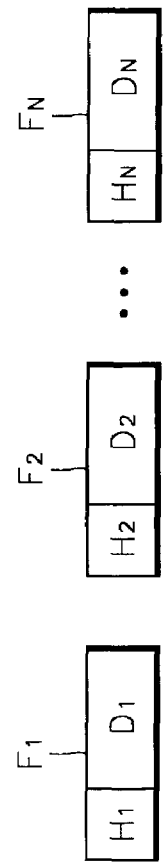
FIGS. 4A through 4C illustrate the structures of transmission frames in a transmitting apparatus for transmitting multicast data according to an embodiment of the present invention.
Figure 4B:
Figure 4C:
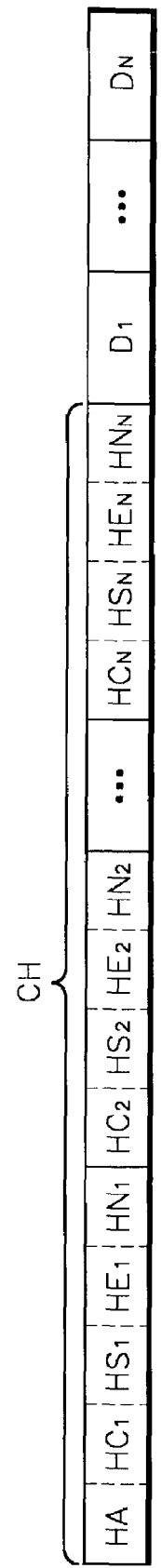

FIGS. 4A through 4C illustrate the preferred structures of transmission frames in a transmitting apparatus for transmitting multicast data according to an embodiment of the present invention.

FIG. 4A illustrates the structure of a transmission frame for a case where N modulated headers $H_1$ through $H_N$ are added to N modulated multicast streams $D_1$ through $D_N$, respectively, to generate N transmission frames $F_1$ through $F_N$. Referring to FIG. 4A, each frame $F_k$ (k=1, 2, . . . , N) is composed of a header $H_k$ and a data stream $D_k$.

FIG. 4B illustrates the structure of a transmission frame for a case where N modulated headers $H_1$ through $H_N$ are first inserted and N modulated multicast streams $D_1$ through $D_N$ are inserted thereafter to generate a single transmission frame. Referring to FIG. 4B, the headers $H_1$ through $H_N$ and the data streams $D_1$ through $D_N$ are disposed in ascending order of data rate.

When receiving a transmission frame having the structure shown in FIG. 4A or 4B, a receiving apparatus determines whether to receive it by referring to the MAC address HA in the header. In other words, the receiving apparatus receives a relevant data stream only when the receiving apparatus is included in a receiving apparatus group corresponding to the MAC address.

FIG. 4C illustrates the structure of a transmission frame for a case where N headers constitute a single large header CH. Here, it is preferable that each header has a structure as shown in FIG. 3B. Thus, the header CH includes encoding information $HC_1$ through $HC_N$ for N multicast streams, stream sizes $HS_1$ through $HS_N$, other information $HE_1$ through $HE_N$, and bits $HN_1$ through $HN_N$ indicating the existence or non-existence of a multicast stream corresponding to a higher data rate. The header CH may include only the MAC address HA of a receiving apparatus group without including N MAC addresses. When receiving a transmission frame having the structure shown in FIG. 4C, a receiving apparatus determines a portion of a data stream to be received based on the encoding information $HC_1$ through $HC_N$ and the bits $HN_1$ through $HN_N$ indicating the existence or non-existence of a multicast stream corresponding to a higher data rate instead of the MAC address HA.

Figure 5:
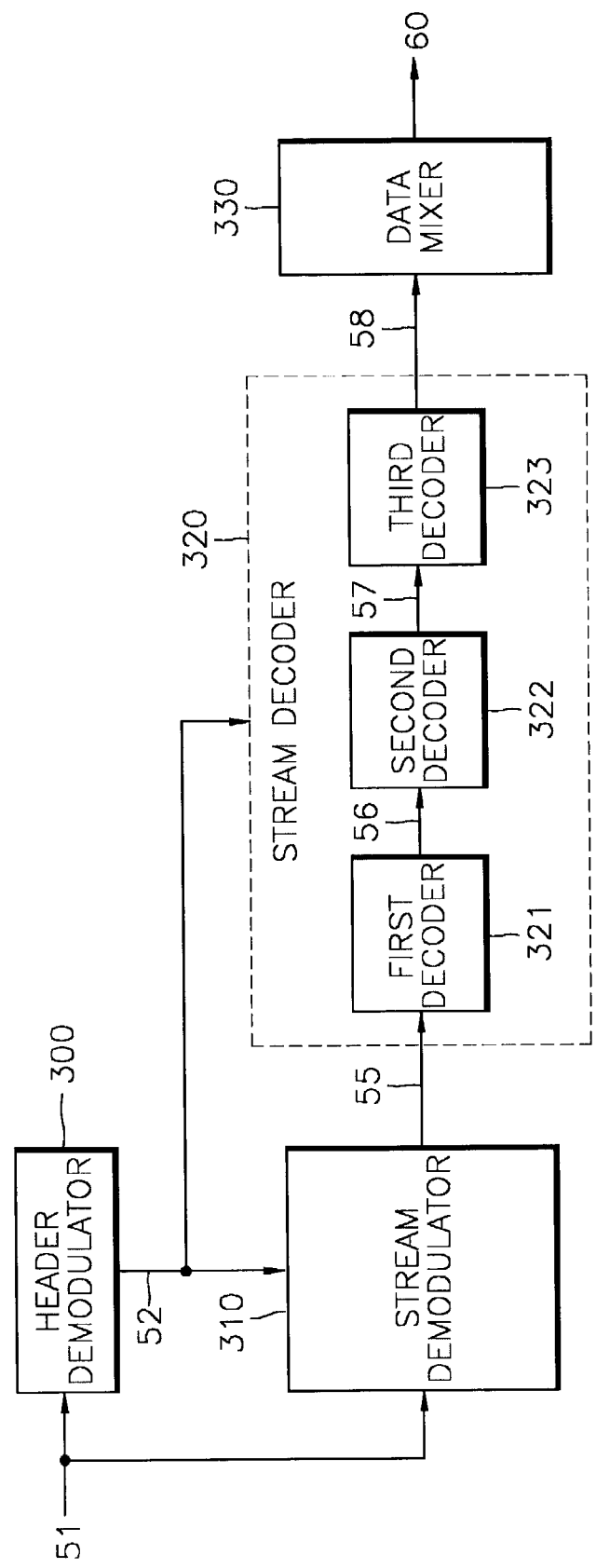
FIG. 5 illustrates a block diagram of a receiving apparatus for receiving multicast data according to an embodiment of the present invention.

FIG. 5 illustrates a block diagram of a receiving apparatus for receiving multicast data according to an embodiment of the present invention. Referring to FIG. 5, the receiving apparatus preferably includes a header demodulator 300, a stream demodulator 310, a stream decoder 320, and a data mixer 330. The header demodulator 300 demodulates the header of at least one transmission frame 51, which is transmitted from an external transmitting apparatus, to generate a header information signal 52.

In the embodiment shown in FIG. 5, a demodulated header has the structure shown in FIG. 3A or 3B. A method of determining a portion of a data stream to be received varies with the structure of a transmission frame. When the transmission frame has the structure shown in FIG. 4A or 4B, the receiving apparatus determines whether it is included in a receiving apparatus group designated by the MAC address HA in each header. If it is determined that the receiving apparatus is included in the receiving apparatus group, the receiving apparatus receives a data stream portion corresponding to the header. Otherwise, the receiving apparatus does not receive the data stream portion.

When the transmission frame has the structure shown in FIG. 4C, the MAC address HA in a header designates a receiving apparatus group including all receiving apparatuses that are destinations of the multicast. If it is determined that a receiving apparatus is not included in the receiving apparatus group, the receiving apparatus does not receive any data from the transmission frame. If it is determined that the receiving apparatus is included in the receiving apparatus group, the receiving apparatus determines a data stream portion to be received based on the encoding information $HC_1$ through $HC_N$ and the bits $HN_1$ through $HN_N$ indicating the existence or non-existence of a multicast stream corresponding to a higher data rate, which are included in the header.

The stream demodulator 310 demodulates data stream portions of the transmission frame 51 which are to be received, in response to the header information signal 52 to generate at least one encoded data stream 55. The stream decoder 320 decodes the at least one encoded data stream 55. For this, the stream decoder 320 preferably includes a first decoder 321 that performs signal constellation demapping on encoded data streams 55, a second decoder 322 that performs deinterleaving on constellation-demapped data streams 56, and a third decoder 323 that performs FEC decoding on constellation-demapped and deinterleaved data streams 57.

The data mixer 330 mixes one or more decoded data streams 58 and outputs a data signal 60 having a scalable data structure. If there is only one data stream that can be received by the receiving apparatus, the data stream itself is data including basic information. If a plurality of data streams are received, data streams including additional information can be added to a data stream including basic information such that data having high-quality information may be received.

Figure 1B:
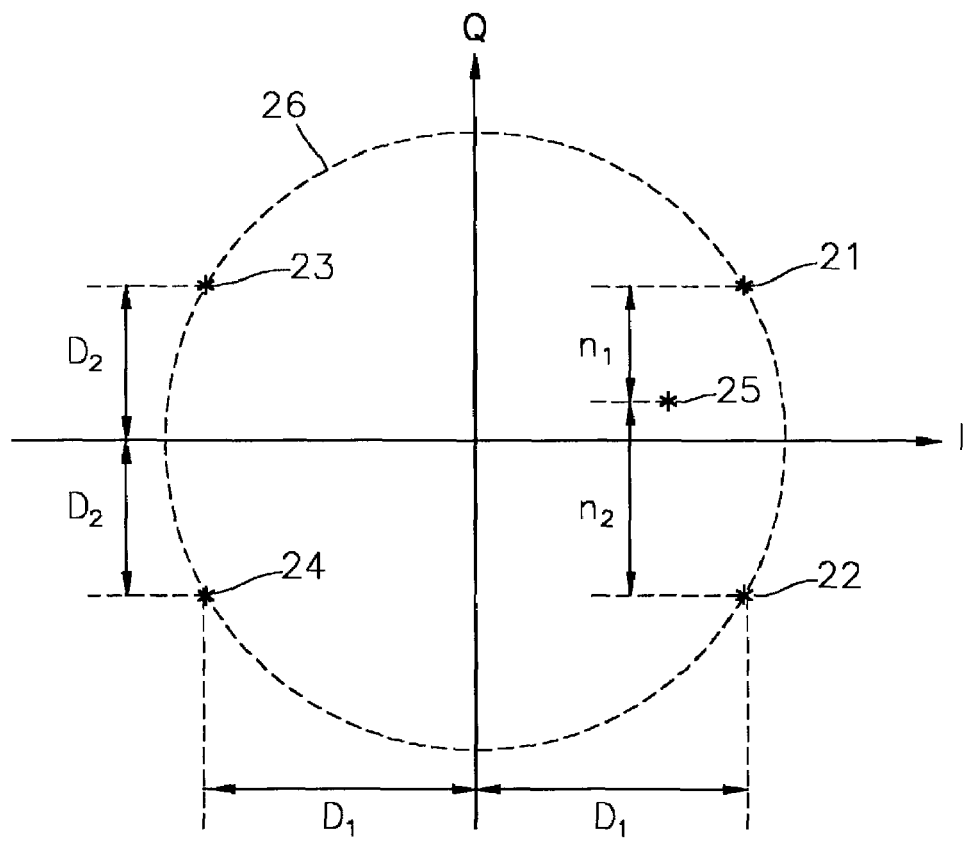
FIG. 1B illustrates a constellation in-phase/quadrature (I/Q) plot with respect to a transmission signal in the UQPSK modulation scheme.

In order to compare a communication system according to an embodiment of the present invention with a communication system using the UQPSK modulation scheme as shown in FIG. 1A, simulations were performed in a wireless LAN system using the Institute of Electrical and Electronics Engineers (IEEE) 802.11a standard, which is a standard for a wireless LAN.

FIG. 6 illustrates a table of parameters related with each modulation scheme that is supported by the IEEE 802.11a standard. Referring to FIG. 6, eight data rates 61 from 6 Mbps to 54 Mbps are supported by the IEEE 802.11a standard. To support the eight data rates 61, Binary Phase Shift Keying (BPSK), Quadrature Phase Shift Keying (QPSK), 16 Quadrature Amplitude Modulation (16 QAM), and 64 QAM were used as modulation schemes 62. A code rate 63 represents a ratio of the number of data bits after encoding to the number of data bits before encoding.

In the IEEE 802.11a standard, orthogonal frequency division multiplexing (OFDM) is used. According to OFDM, forty-eight orthogonal carriers are used for transmission. Each orthogonal carrier is referred to as a subcarrier, and a unit signal burst that is transmitted using the forty-eight subcarriers is referred to as an OFDM symbol. The entries in column 64 indicate the number of encoded bits per subcarrier and is determined in accordance with a particular modulation scheme. For example, the number of encoded bits per subcarrier is one for BPSK, two for QPSK, four for 16 QAM, and six for 64 QAM. Since a single OFDM symbol is transmitted using forty-eight subcarriers, column 65 indicates the number of encoded bits per OFDM symbol, which is the product of forty-eight and the number of encoded bits per subcarrier as shown in column 64.

Since all receiving apparatuses must be able to receive signals in a multicast transmission, only a mandatory mode is used. The mandatory mode indicates a modulation scheme that is forced to be supported in a system. When using the IEEE 802.11a standard, three cases as indicated in bold and by reference labels 71, 72, and 73 in FIG. 6 in which data rates are 6, 12, and 24 Mbps, respectively, are mandatory modes.

For these mandatory modes, assume that the total number of receiving apparatuses is A and that the number of receiving apparatuses in each of three receiving apparatus groups, each of which can receive data at one of the three data rates, is $u_1$, $u_2$, and $u_3$, respectively. For the clarity of description, when it is assumed that the numbers of receiving apparatuses in each receiving apparatus group (except the receiving apparatuses that can receive data at a higher data rate than a data rate to which that receiving apparatus group corresponds) are $a_1$, $a_2$, and $a_3$, respectively then $a_1=u_1-u_2$, $a_2=u_2-u_3$, $a_3=u_3$, and $a_1+a_2+a_3=A$. Accordingly, $u_1=A$, $u_2=A-a_1$, and $u_3=A-a_1-a_2$. If it is assumed that the number of data bits that can be transmitted in each OFDM symbol is $r_1$, $r_2$, and $r_3$, respectively, then from column 66 in the table shown in FIG. 6, $r_1=24$, $r_2=48$, and $r_3=96$.

When it is assumed that the number of OFDM symbols to be transmitted using BPSK, QPSK, and 16 QAM is $n_1$, $n_2$, and $n_3$, respectively, and the total number of bursts that can be used for transmission is M, Formula (1) can be rewritten with respect to $a_1$, $a_2$, and $a_3$ as shown in the formula $$\sum_{k=1}^{3}(r_k u_k)n_k = r_1 u_1 n_1 + r_2 u_2 n_2 + r_3 u_3 n_3 \quad (3)$$
$$= r_1 A n_1 + r_2(A-a_1)n_2 + r_3(A-a_1-a_2)n_3$$

When the size $r_{min}$ of basic data is 256 bits, because $r_{min}/r_1=256/24=10.67$, $n_1$ must be greater than 11 in order to allow all of the A receiving apparatuses to receive the basic data. Under the above condition, the values of $n_1$, $n_2$, and $n_3$ satisfying Formula (3) are determined according to the distribution of $a_1$, $a_2$, and $a_3$.

Figure 7:
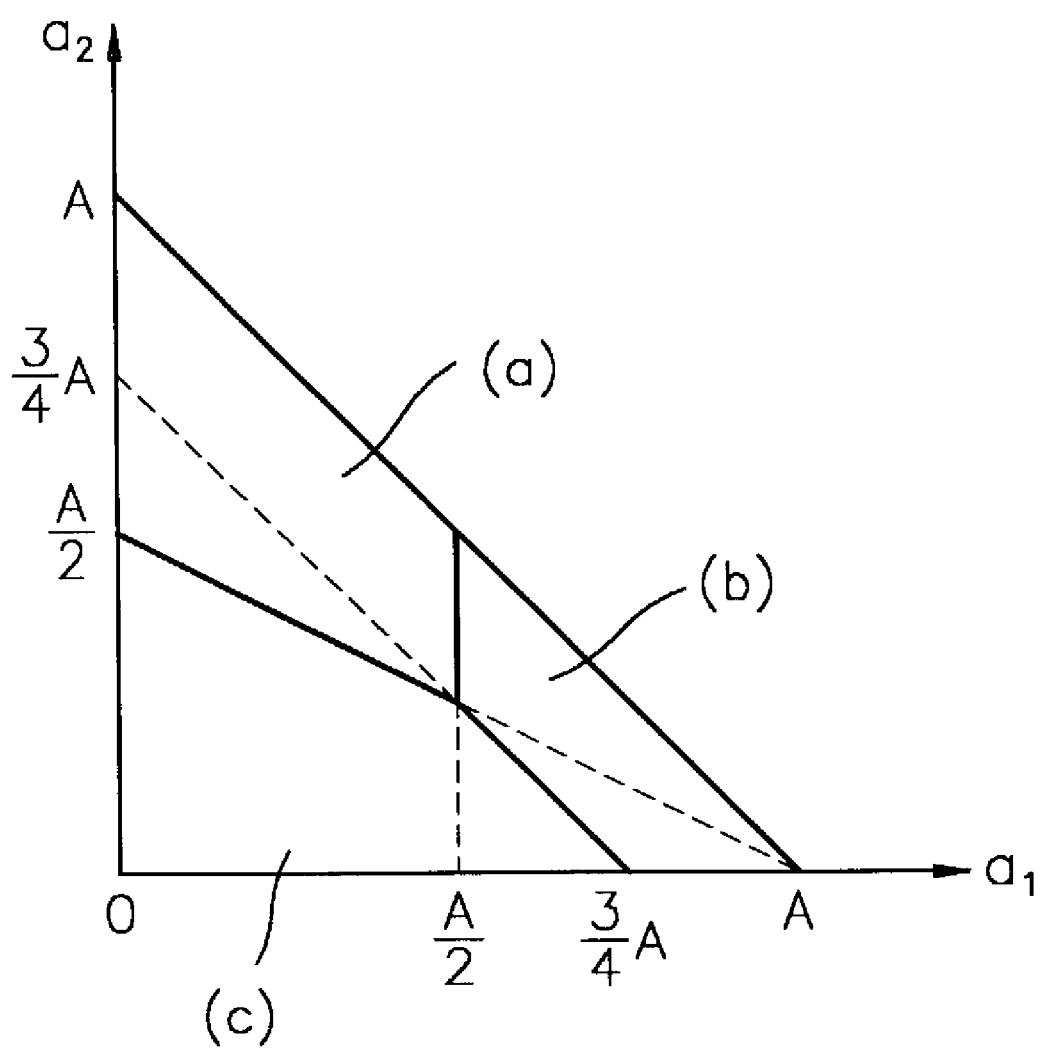
FIG. 7 illustrates a graph of the distribution of data rates of receiving apparatuses in simulations for comparing the communication system according to the present invention with a communication system using the UQPSK modulation scheme as shown in FIG. 1A.

FIG. 7 illustrates a graph of the distribution of the receiving apparatuses having different data rates. Referring to FIG. 7, when $a_1 \leq A/2$ and $a_1+a_2 \geq \frac{3}{4}A$, $a_1/2+a_2 \geq A/2$ and that is, for receiving apparatuses in a range (a), the value of "k" is 1 when the value of $r_k u_k$ is maximized. Accordingly, all of the M bursts are modulated using BPSK at a data rate of 6 Mbps for transmission.

When $a_1 > A/2$ and $a_1+2a_2 < A$, $a1+a2 > \frac{3}{4}A$ that is, for receiving apparatuses in a range (b), the value of "k" is 2 when the value of $r_k u_k$ is maximized. Accordingly, 11 bursts among the M bursts are modulated using BPSK and the remaining M−11 bursts are modulated using QPSK at a data rate of 12 Mbps, for transmission.

When $a_1+a_2 < \frac{3}{4}A$ and $a_1+a_2/2 < A$, that is, for receiving apparatuses in a range (c), the value of "k" is 3 when the value of $r_k u_k$ is maximized. Accordingly, 11 bursts among the M bursts are modulated using BPSK and the remaining M−11 bursts are modulated using 16 QAM at a data rate of 24 Mbps, for transmission.

The following description concerns the average receiving data rate and outage probability of a receiving apparatus in each of the ranges (a), (b) and (c) shown in FIG. 7. For exemplary purposes, it was assumed that the total number M of bursts was 50 and the total number A of receiving apparatuses was 20. In the range (a), a case where $a_1=10$, $a_2=7$, and $a_3=3$ was considered. In the range (b), a case where $a_1=7$, $a_2=8$, and $a_3=5$ was considered. In the range (c), a case where $a_1=7$, $a_2=3$, and $a_3=10$ was considered. Here, it was assumed that the SNRs of receiving apparatuses had a uniform distribution in which they increased by 0.5 dB. For example, when $a_3=3$, the three receiving apparatuses had higher SNRs than the minimum SNR, at which 16 QAM data could be received, by 0 dB, 0.5 dB, and 1 dB, respectively. An SNR for receiving QPSK data needs to be 3 dB higher than that for receiving BPSK data, and an SNR for receiving 16 QAM data needs to be 7 dB higher than that for receiving QPSK data.

In a communication system using the UQPSK modulation scheme as shown in FIG. 1A, a necessary SNR is determined according to the value of $\lambda$. For exemplary purposes, it may be assumed that an SNR with respect to an entire signal that is received by a receiving apparatus through a communication channel is $\gamma_{UQPSK}$, an SNR with respect to an I component is $\gamma_I$, and an SNR with respect to a Q component is $\gamma_Q$. Then, $\gamma_Q=\lambda^2 \times \gamma_I$ and $\gamma_{UQPSK}=\gamma_I+\gamma_Q$, so $\gamma_Q=\lambda^2 \gamma_{UQPSK}/(1+\lambda^2)$. Accordingly, bit error rates (BERs) with respect to the respective I and Q components are expressed as the formula $$BER_I = \frac{1}{2}\text{erfc}\left(\sqrt{\frac{\gamma_{UQPSK}}{(1+\lambda^2)}}\right) \quad (4)$$

$$BER_Q = \frac{1}{2}\text{erfc}\left(\sqrt{\frac{\lambda^2 \gamma_{UQPSK}}{(1+\lambda^2)}}\right)$$

When SNRs with respect to received signals in the BPSK and QPSK modulation schemes are $\gamma_{BPSK}$ and $\gamma_{QPSK}$, respectively, BERs in the respective BPSK and QPSK modulation schemes are expressed as Formula (5). Accordingly, in order to allow basic data, which is transmitted through an I component in the system shown in FIG. 1A, to have the same BER as basic data that is transmitted using the BPSK modulation scheme, $\gamma_{UQPSK}$ must be greater than $\gamma_{BPSK}$ by $10 \log_{10}(1+\lambda^2)$ dB. In order to allow additional data, which is transmitted through a Q component in the system shown in FIG. 1A, to have the same BER as additional data that is transmitted using the QPSK modulation scheme, $\gamma_{UQPSK}$ must be greater than $\gamma_{QPSK}$ by $10 \log_{10}(1+\lambda^2)/2\lambda^2$ dB, or $$BER_{BPSK} = \frac{1}{2}\text{erfc}\left(\sqrt{\gamma_{BPSK}}\right) \quad (5)$$

$$BER_{QPSK} = \frac{1}{2}\text{erfc}\left(\sqrt{\frac{\gamma_{QPSK}}{2}}\right)$$

FIGS. 8A through 8C illustrate tables showing the number of receiving apparatuses that can receive data in each of the BPSK and QPSK modulation schemes, an average data rate, and the number of outages in each range shown in FIG. 7 when the UQPSK modulation scheme shown in FIG. 1A is used. Referring to FIGS. 8A through 8C, as the value of $\lambda$ increases as shown in the first row of the table in FIG. 8A, the number of outages increases even through the number of receiving apparatuses available for QPSK increases.

First, when A=20, $a_1=10$, $a_2=7$, and M=50, that is, for the range (a) of FIG. 7, a transmitting apparatus for multicast data according to the present invention modulates 50 bursts at a data rate of 6 Mbps using BPSK. Accordingly, all of the 20 receiving apparatuses receive the 50 bursts at 6 Mbps, and the average data rate is 6 Mbps. FIG. 8A shows the results of simulations performed using the UQPSK modulation scheme shown in FIG. 1A. Referring to FIG. 8A, the average data rates for most of the values of $\lambda$ are at least 6 Mbps, but the number of outages increases as the value of $\lambda$ increases.

When A=20, $a_1=7$, $a_2=8$, and M=50, that is, for the range (b) of FIG. 7, a transmitting apparatus for multicast data according to the present invention modulates 11 bursts at a data rate of 6 Mbps using BPSK and modulates 39 bursts at a data rate of 12 Mbps using QPSK. Accordingly, the average data rate is 7.404 Mbps. Referring to FIG. 8B, when using the UQPSK modulation scheme shown in FIG. 1A, the average data rate is in a range from 6 Mbps to 7.8 Mbps, but the number of outages increases as the value of λ increases.

When A=20, $a_1$=7, $a_2$=3, and M=50, that is, for the range (c) of FIG. 7, a transmitting apparatus for multicast data according to the present invention modulates 11 bursts at a data rate of 6 Mbps using BPSK and modulates 39 bursts at a data rate of 24 Mbps using 16 QAM. Accordingly, the average of the above data rates is 10.68 Mbps. Referring to FIG. 8C, when using the UQPSK modulation scheme shown in FIG. 1A, the number of outages increases as the value of λ increases, and the maximum of the average of the data rates is only 8.4 Mbps.

In a case where the data rates of all receiving apparatuses are low and when the UQPSK modulation scheme shown in FIG. 1A is used, the average data rate is a little higher than that in the present invention. However, receiving apparatuses having a low SNR cannot receive transmitted data due to an outage. Alternatively, in a case where the data rates of all receiving apparatuses are high, an average data rate in the present invention is much higher than in the case shown in FIG. 1A because the present invention uses 16 QAM, which cannot be provided in the UQPSK modulation scheme.

In transmission of multicast data according to the present invention and transmission of multicast data using the transmitting apparatus shown in FIG. 1A, the sum of data rates and an outage probability, which vary with changes in predetermined parameters, were calculated. For a path loss model, a log distance model and a lognormal fading model were used. A path loss L is given by the formula $$L = 20\log\left(\frac{4\pi f}{c}\right) + 10\alpha\log d + X_\sigma \text{[dB]} \quad (6)$$

where, "f" indicates a carrier frequency, "c" indicates the speed of light, "d" indicates the distance between a transmitting apparatus and a receiving apparatus in meters, α indicates a path loss exponent, and $X_\sigma$ indicates the lognormal fading that is normally distributed with a standard deviation of σ.

An SNR at each receiving apparatus can be calculated using the formula $$SNR = P_{tx} - L - N_{AWGN}$$

$$N_{AWGN} = 10 \log BW \cdot kT + NF \quad (7)$$

where $P_{tx}$ was a transmitter power of 24 dBm, BW was a bandwidth of 20 MHz, "k" is Boltzman's constant (1.38× $10^{-23}$ Joule/Kelvin), T was a temperature of 293 K, and NF was a noise figure of 6 dB. The number of multicast receiving apparatuses, U, has a Poisson distribution as seen in the formula $$P(U = u) = e^{-a}\frac{a^u}{u!} \quad (8)$$

where "a" is the average number of receiving apparatuses.

The receiving apparatuses were assumed to be uniformly distributed in a circle. The radius of the circle was determined as the maximum distance that allowed a receiving apparatus to reliably receive BPSK data in the absence of lognormal fading. Assuming an additive white Gaussian noise (AWGN) channel, SNRs required for BPSK and QPSK were obtained using Formula (5) in which the BER was set to $10^{16}$. An SNR required for 16 QAM was obtained by adding 7 dB to the SNR required for QPSK.

Figure 9A:
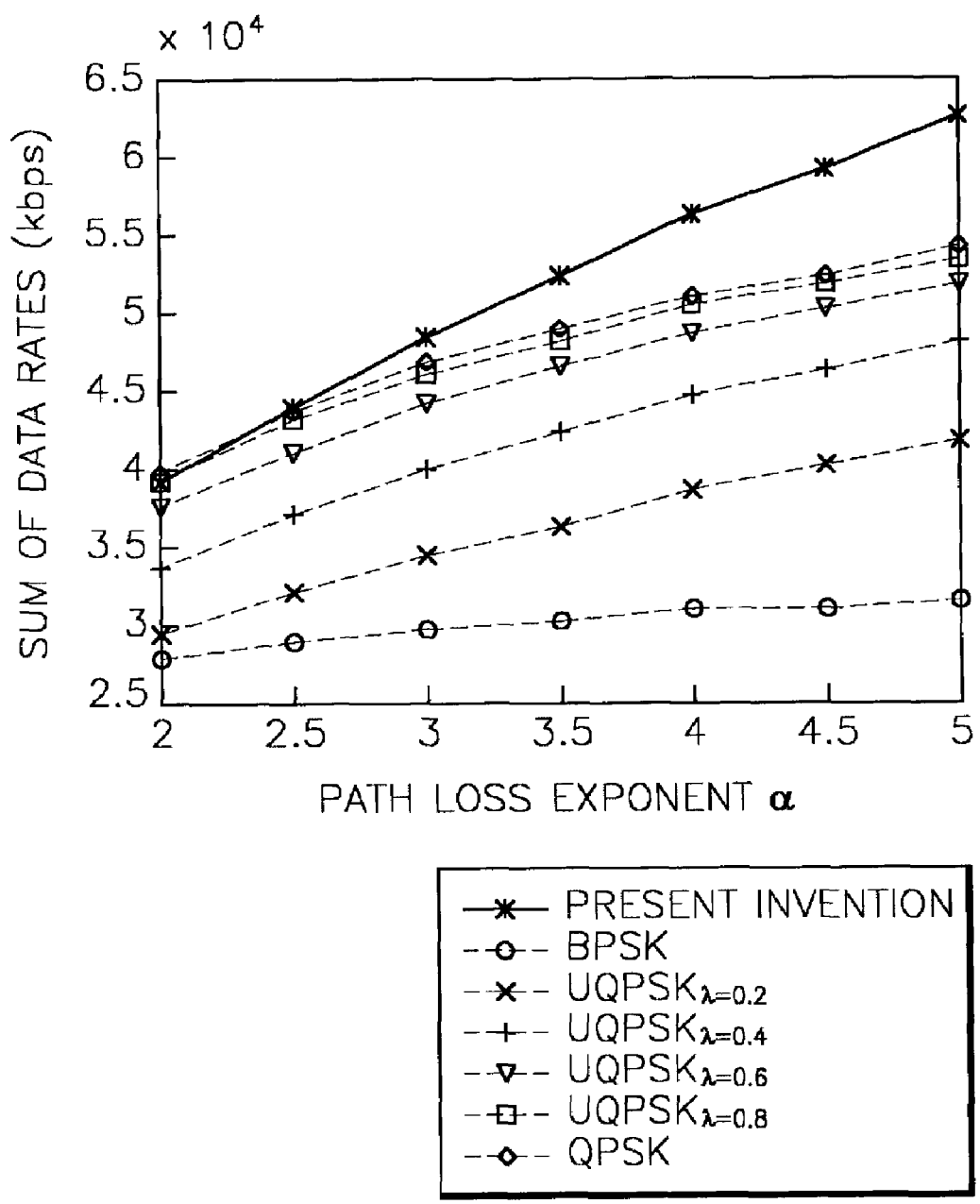
FIGS. 9A through 9F illustrate graphs showing changes in the sum of data rates and an outage probability with respect to a path loss exponent, the average number of receiving apparatuses, and the standard deviation of lognormal fading in simulations for comparing the communication system according to the present invention with a communication system using the UQPSK modulation scheme as shown in FIG. 1A.

FIG. 9A illustrates a graph of the sum of data rates that vary with a path loss exponent α. Referring to FIG. 9A, when the path loss exponent exceeds 2.5, the sum of data rates obtained in the present invention is greater than that obtained using UQPSK. Here, the average number "a" of receiving apparatuses was 30, and the standard deviation σ of lognormal fading was 4 dB.

Assume that the receiving apparatuses can receive BPSK data, QPSK data, and 16 QAM data at distances $d_1$, $d_2$, and $d_3$, respectively. The number of receiving apparatuses that can receive data transmitted using each modulation scheme is proportional to the area of each circle. From Formula (6), an average ratio of the number $u_2$ of receiving apparatuses that can receive QPSK data to the number $u_3$ of receiving apparatuses that can receive 16 QAM data, and an average ratio of the number $u_1$ of receiving apparatuses that can receive BPSK data to the number $u_3$ of receiving apparatuses that can receive 16 QAM data are given as the formula $$E\left[\frac{u_2}{u_3}\right] = \frac{\pi d_2^2 - \pi d_3^2}{\pi d_3^2} = 10^{\frac{7}{10\alpha}} - 1 \quad (9)$$

$$E\left[\frac{u_1}{u_3}\right] = \frac{\pi d_1^2 - \pi d_2^2}{\pi d_3^2} = 10^{\frac{10}{10\alpha}} - 10^{\frac{7}{10\alpha}} = 10^{\frac{1}{\alpha}} - 10^{\frac{7}{10\alpha}}$$

It may be seen from Formula (9) that as the path loss exponent α increases, more receiving apparatuses can receive signals that are modulated at a higher data rate.

Figure 9B:
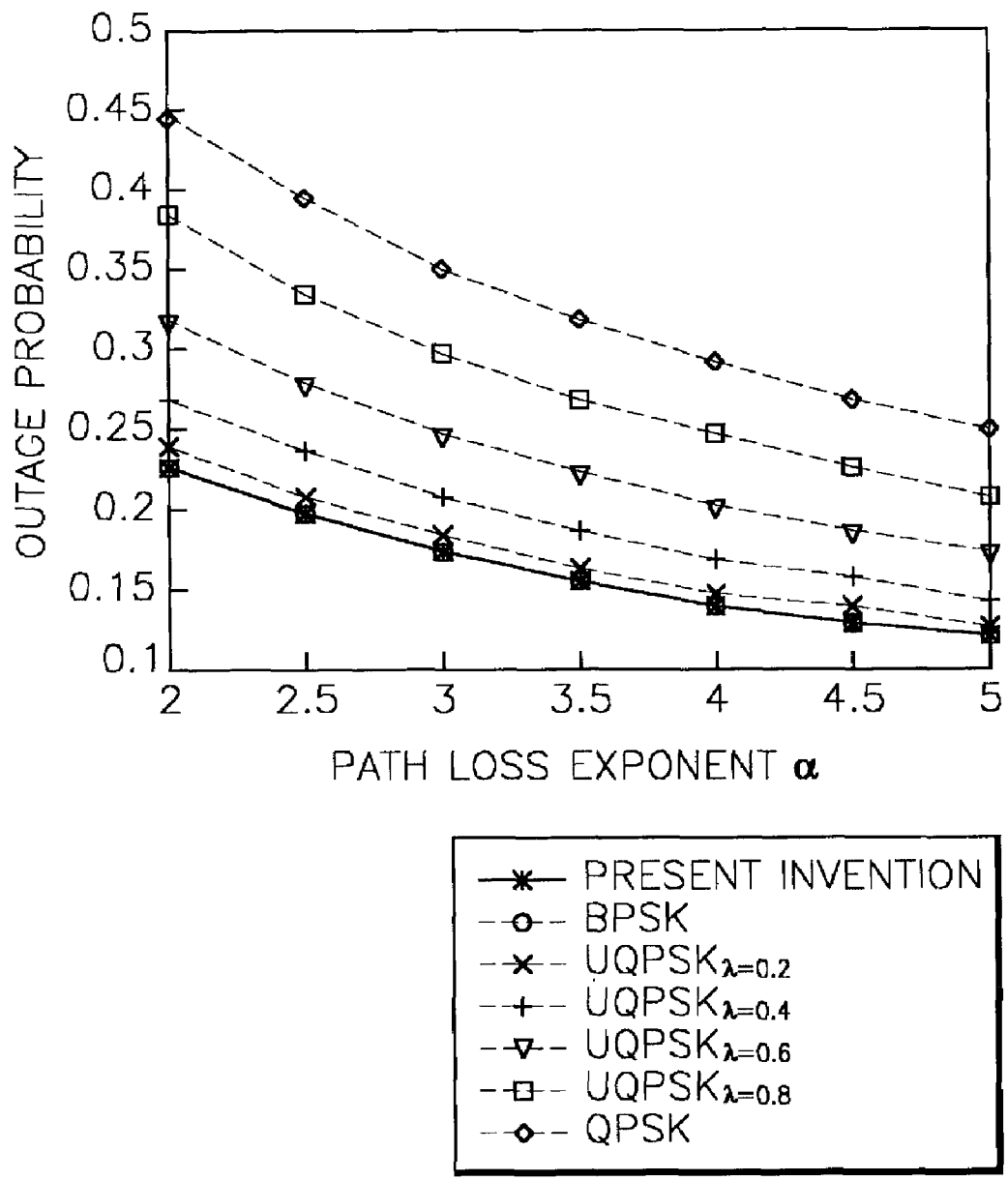

FIG. 9B illustrates a graph of an outage probability that varies with the path loss exponent α. It may be inferred from FIG. 9B that the outage probability obtained in the present invention is always lower than the outage probability obtained using UQPSK shown in FIG. 1A. This is because UQPSK needs a higher SNR than that needed for receiving BPSK modulated signals even when a receiving apparatus receives only I components.

Figure 9C:
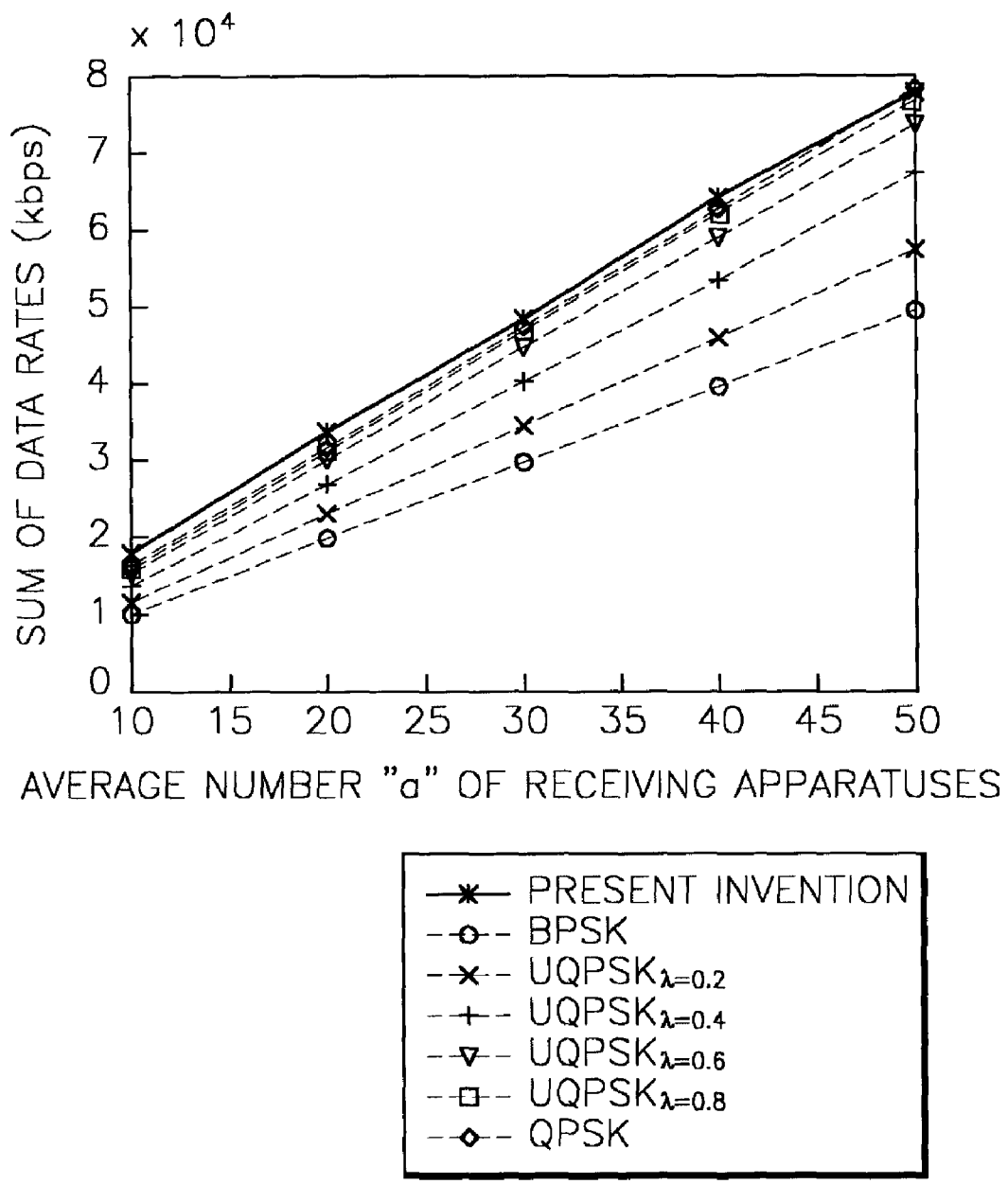

FIG. 9C illustrates a graph of the sum of data rates that varies with the average number "a" of receiving apparatuses. It may be inferred from FIG. 9C that when the average number "a" of receiving apparatuses is in a range from 10 to 40, the sum of data rates obtained in the present invention is greater than that obtained using UQPSK.

Figure 9D:
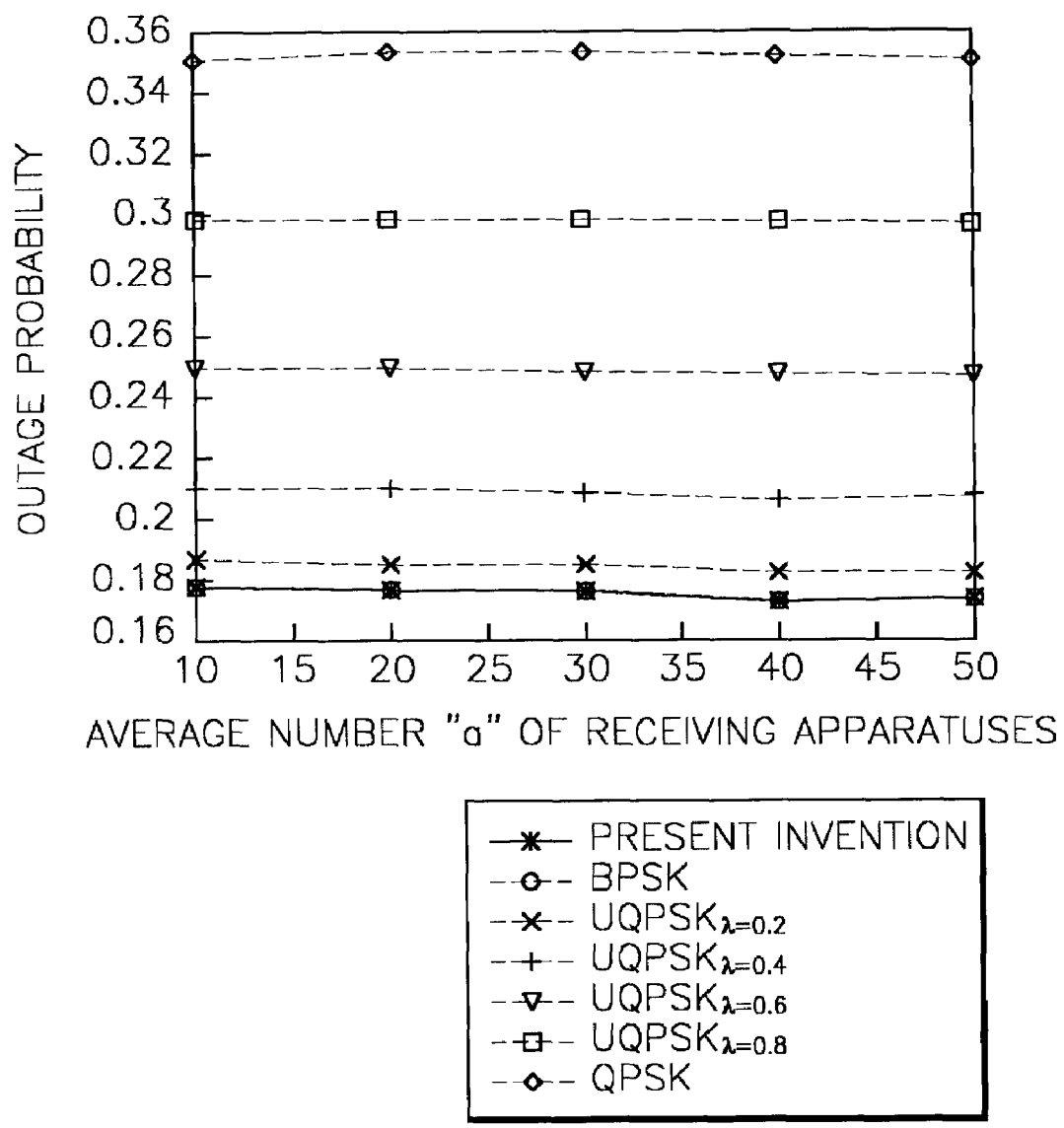

FIG. 9D illustrates a graph of an outage probability that varies with the average number "a" of receiving apparatuses. It may be inferred from FIG. 9D that the outage probability has no relation with the average number "a" of receiving apparatuses.

Referring to FIGS. 9C and 9D, when λ=1 in the UQPSK modulation scheme, that is, when QPSK is performed in the UQPSK modulation scheme, the sum of data rates is the same as in the present invention, but the outage probability is double.

Figure 9E:
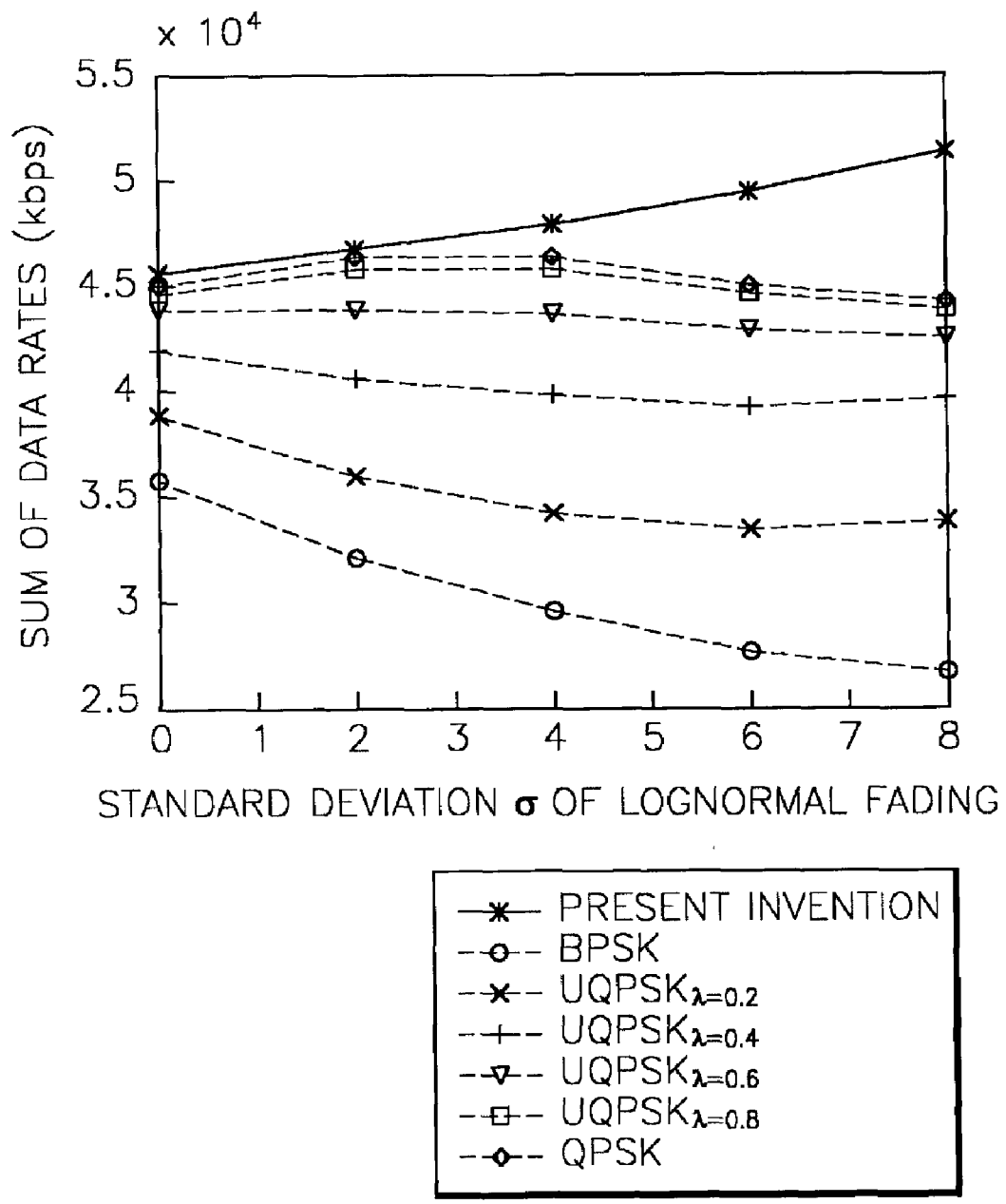
Figure 9F:
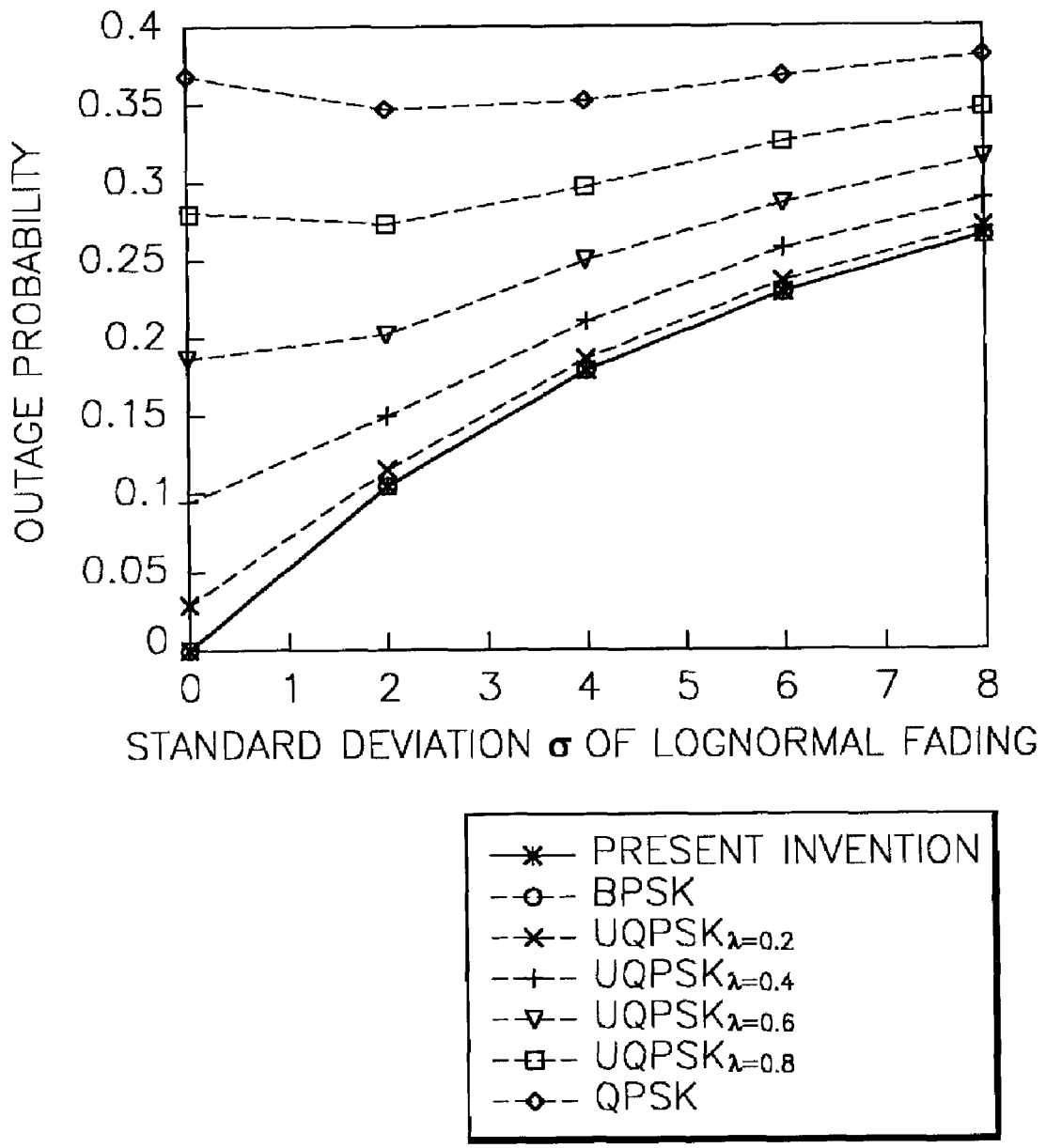

FIG. 9E illustrates a graph of the sum of data rates that varies with the standard deviation a of lognormal fading. FIG. 9F is a graph of an outage probability that varies with the standard deviation σ of lognormal fading. Here, the path loss exponent α was 3, and the average number "a" of receiving apparatuses was 30.

Referring to FIG. 9E, as the standard deviation of lognormal fading increases, the sum of data rates increases in the present invention but decreases in the UQPSK modulation scheme.

Referring to FIG. 9F, as the standard deviation of lognormal fading increases, the outage probability increases in both the present invention and the UQPSK modulation scheme. In the present invention, the outage probability is the same as that obtained in the case of BPSK and is always lower than that obtained when λ is greater than 0 in the UQPSK modulation scheme.

The present invention may be realized as a code which is recorded on a computer readable recording medium and can be read by a computer including any apparatus having an information processing function. The computer readable recording medium may be any type on which data which can be read by a computer system, for example, a ROM, a RAM, a CD-ROM, a magnetic tape, a floppy disc, an optical data storage device, and the like.

According to apparatuses and methods for transmitting and receiving multicast data having a scalable data structure, data rates for transmitting different streams and receiving apparatus groups are previously determined before transmission so that the amount of additional information received by all receiving apparatuses can be optimally increased while ensuring that all of the receiving apparatuses can receive basic information. In addition, the amount of data received by all of the receiving apparatuses is preferably maximized, and the number of receiving apparatuses that can receive high-quality information including both basic information and additional information is also preferably maximized.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A transmitting apparatus for wirelessly transmitting multicast data having a scalable data structure to a plurality of external receiving apparatuses, the transmitting apparatus comprising:
   a stream generator that divides the multicast data having the scalable data structure into a plurality of multicast streams corresponding to predetermined data rates at which the plurality of external receiving apparatuses can receive data;
   an encoding processor that individually encodes the plurality of multicast streams;
   a header processor that generates a header corresponding to each of the encoded multicast streams and modulates the header at a predetermined data rate;
   a stream modulator that modulates each of the encoded multicast streams at predetermined data rates corresponding to the respective encoded multicast streams; and
   a frame generator that adds the modulated headers to the modulated multicast streams to generate at least one transmission frame.

2. The transmitting apparatus as claimed in claim 1, wherein the encoding processor comprises:
   a first processor that performs forward error correction (FEC) encoding on the plurality of multicast streams;
   a second processor that performs interleaving of the FEC-encoded multicast streams; and
   a third processor that performs signal constellation mapping on the FEC-encoded and interleaved multicast streams.

3. The transmitting apparatus as claimed in claim 1, wherein the stream generator generates the plurality of multicast streams such that a multicast stream including basic information corresponds to the lowest data rate at which all of the receiving apparatuses can receive data and that multicast streams including additional information, which is added to the basic information to generate high-quality information, correspond to data rates that allow the sum of the amounts of multicast data received by all of the receiving apparatuses to be maximized.

4. The transmitting apparatus as claimed in claim 1, wherein the stream generator generates the plurality of multicast streams such that a multicast stream including basic information corresponds to the lowest data rate at which all of the receiving apparatuses can receive data and that each multicast stream including additional information corresponds to a data rate that allows the product of the predetermined data rate and the number of receiving apparatuses available at the predetermined data rate to be maximized.

5. The transmitting apparatus as claimed in claim 1, wherein the header processor modulates headers at the same data rates as those of multicast streams corresponding to the headers.

6. The transmitting apparatus as claimed in claim 1, wherein the header processor modulates the headers at the lowest data rate at which all of the receiving apparatuses can receive data.

7. The transmitting apparatus as claimed in claim 1, wherein each header comprises a media access control (MAC) address of a receiving apparatus group that includes receiving apparatuses having a data rate at which a multicast stream corresponding to the header can be received, encoding information that has been applied to the multicast stream, and the size of the multicast stream.

8. The transmitting apparatus as claimed in claim 7, wherein each header further comprises information indicating the existence or non-existence of another multicast stream corresponding to a higher data rate than a data rate corresponding to the current multicast stream.

9. The transmitting apparatus as claimed in claim 1, wherein the frame generator adds the modulated headers to the corresponding modulated multicast streams, to generate a plurality of transmission frames.

10. The transmitting apparatus as claimed in claim 1, wherein the frame generator arranges the modulated multicast streams in ascending order of data rate and adds a set of the modulated headers that are arranged according to the order of the modulated multicast streams to the front of a set of the arranged modulated multicast streams to generate a single transmission frame.

11. A method of wirelessly transmitting multicast data having a scalable data structure to a plurality of external receiving apparatuses, the method comprising:
   (a) dividing the multicast data having a scalable data structure into a plurality of multicast streams corresponding to predetermined data rates at which the plurality of external receiving apparatuses can receive data;
   (b) individually encoding the plurality of multicast streams;
   (c) generating a header corresponding to each of the encoded multicast streams and modulating the header at a predetermined data rate;
   (d) modulating each of the encoded multicast streams at a predetermined data rate; and (e) adding the modulated headers to the modulated multicast streams to generate at least one transmission frame.

12. The method as claimed in claim 11, wherein (b) comprises:
(b1) performing forward error correction (FEC) encoding on the plurality of multicast streams;
(b2) performing interleaving of the FEC-encoded multicast streams; and
(b3) performing signal constellation mapping on the FEC-encoded and interleaved multicast streams.

13. The method as claimed in claim 11, wherein (a) comprises generating the plurality of multicast streams such that a multicast stream including basic information corresponds to the lowest data rate at which all of the receiving apparatuses can receive data and that multicast streams including additional information, which is added to the basic information to generate high-quality information, correspond to data rates that allow the sum of the amounts of multicast data received by all of the receiving apparatuses to be maximized.

14. The method as claimed in claim 11, wherein (a) comprises generating the plurality of multicast streams such that a multicast stream including basic information corresponds to the lowest data rate at which all of the receiving apparatuses can receive data and that each multicast stream including additional information corresponds to a data rate that allows the product of the predetermined data rate and the number of receiving apparatuses available at the predetermined data rate to be maximized.

15. The method as claimed in claim 11, wherein (c) comprises modulating the headers at the same data rates as those of multicast streams corresponding to the headers.

16. The method as claimed in claim 11, wherein (c) comprises modulating the headers at the lowest data rate at which all of the receiving apparatuses can receive data.

17. The method as claimed in claim 11, wherein each header comprises a media access control (MAC) address of a receiving apparatus group that includes receiving apparatuses having a data rate at which a multicast stream corresponding to the header can be received, encoding information that has been applied to the multicast stream, and the size of the multicast stream.

18. The method as claimed in claim 17, wherein each header further comprises information indicating the existence or non-existence of another multicast stream corresponding to a higher data rate than a data rate corresponding to the current multicast stream.

19. The method as claimed in claim 11, wherein (e) comprises adding the modulated headers to the corresponding modulated multicast streams, to generate a plurality of transmission frames.

20. The method as claimed in claim 11, wherein (e) comprises arranging the modulated multicast streams in ascending order of data rate and adding a set of the modulated headers that are arranged according to the order of the modulated multicast streams to the front of a set of the arranged modulated multicast streams to generate a single transmission frame.

21. A computer readable recording medium in which a program is recorded, the program being provided for performing in a computer the steps of:
(a) dividing multicast data having a scalable data structure into a plurality of multicast streams corresponding to predetermined data rates at which a plurality of external receiving apparatuses can receive data;
(b) individually encoding the plurality of multicast streams;
(c) generating a header corresponding to each of the encoded multicast streams and modulating the header at a predetermined data rate;
(d) modulating each of the encoded multicast streams at a predetermined data rate; and
(e) adding the modulated headers to the modulated multicast streams to generate at least one transmission frame.

22. A receiving apparatus for wirelessly receiving multicast data having a scalable data structure from an external transmitting apparatus, the receiving apparatus comprising:
a header demodulator that demodulates a header portion of at least one transmission frame transmitted from the external transmitting apparatus to generate a header information signal;
a stream demodulator that demodulates a data stream portion to be received from the transmission frame in response to the header information signal to generate one or more encoded data streams;
a decoder that decodes the one or more encoded data streams; and
a data mixer that mixes the one or more decoded data streams and outputs data having a scalable data structure.

23. A method of wirelessly receiving multicast data having a scalable data structure from an external transmitting apparatus, the method comprising:
(a) demodulating a header portion of at least one transmission frame transmitted from the transmitting apparatus and determining a data stream portion to be received from the transmission frame;
(b) demodulating the data stream portion to generate one or more encoded data streams;
(c) decoding the one or more encoded data streams; and
(d) mixing the one or more decoded data streams and outputting data having a scalable data structure.

24. A computer readable recording medium in which a program is recorded, the program being provided for performing in a computer the steps of:
(a) demodulating a header portion of at least one transmission frame transmitted from an external transmitting apparatus and determining a data stream portion to be received from the transmission frame;
(b) demodulating the data stream portion to generate one or more encoded data streams;
(c) decoding the one or more encoded data streams; and
(d) mixing the one or more decoded data streams and outputting data having a scalable data structure.

25. A wireless communication system comprising:
a transmitting apparatus and a plurality of receiving apparatuses,
the transmitting apparatus including:
a stream generator that divides multicast data having a scalable data structure into a plurality of multicast streams corresponding to predetermined data rates at which the plurality of receiving apparatuses can receive data;
an encoding processor that individually encodes the plurality of multicast streams;
a header processor that generates a header corresponding to each of the encoded multicast streams and modulates the header at a predetermined data rate;
a stream modulator that modulates each of the encoded multicast streams at a predetermined data rate; and a frame generator that adds the modulated headers to the modulated multicast streams to generate at least one transmission frame, each one of the plurality of receiving apparatuses including:
  a header demodulator that demodulates a header portion of at least one transmission frame transmitted from the transmitting apparatus to generate a header information signal;
  a stream demodulator that demodulates a data stream portion to be received from the transmission frame in response to the header information signal to generate one or more encoded data streams;
  a decoder that decodes the one or more encoded data streams; and
  a data mixer that mixes the one or more decoded data streams and outputs data having a scalable data structure.

* * * * *